(12) United States Patent
Aklik et al.

(10) Patent No.: US 10,901,866 B2
(45) Date of Patent: Jan. 26, 2021

(54) FAILURE DETECTION AND DATA RECOVERY IN A STORAGE SYSTEM

(71) Applicant: Seagate Technology LLC, Fremont, CA (US)

(72) Inventors: Mehmet Emin Aklik, Shakopee, MN (US); Ryan James Goss, Shakopee, MN (US); Antoine Khoueir, Shakopee, MN (US); Nicholas Odin Lien, Shakopee, MN (US)

(73) Assignee: Seagate Technology, LLC, Fremont, CA (US)

( * ) Notice: Subject to any disclaimer, the term of this patent is extended or adjusted under 35 U.S.C. 154(b) by 20 days.

(21) Appl. No.: 16/052,108

(22) Filed: Aug. 1, 2018

(65) Prior Publication Data

US 2019/0042379 A1 Feb. 7, 2019

Related U.S. Application Data

(60) Provisional application No. 62/539,548, filed on Aug. 1, 2017.

(51) Int. Cl.
*G06F 11/00* (2006.01)
*G06F 11/20* (2006.01)
(Continued)

(52) U.S. Cl.
CPC ........ *G06F 11/2094* (2013.01); *G06F 11/076* (2013.01); *G06F 11/0793* (2013.01);
(Continued)

(58) Field of Classification Search
CPC .............. G06F 11/2094; G06F 11/076; G06F 11/0793; G06F 11/3037; G06F 11/16;
(Continued)

(56) References Cited

U.S. PATENT DOCUMENTS 8,924,636 B2 * 12/2014 Hirao .................. G06F 12/0246
711/103
9,471,428 B2 * 10/2016 Chinnakkonda Vidyapoornachary ......................
G06F 3/0679
(Continued)

OTHER PUBLICATIONS

R. Maddah, S. Cho and R. Melhem, "Data Dependent Sparing to Manage Better-Than-Bad Blocks," in IEEE Computer Architecture Letters, vol. 12, No. 2, pp. 43-46, Jul.-Dec. 2013. (Year: 2013).*

*Primary Examiner* — Anthony J Amoroso
(74) *Attorney, Agent, or Firm* — Taylor English Duma LLP (57) ABSTRACT

Systems and methods presented herein provide for failure detection and data recovery in a storage system. In one embodiment, a method operable in a storage system comprises locating failures in data blocks in storage area of a storage device, categorizing the failures into block groups, each block group comprising one or more data blocks having failures, and halting input/output (I/O) operations to data blocks in a first of the block groups due to the failures of the first block group. The method also includes detecting additional failures in one or more data blocks of other block groups remaining in the storage area, and determining when to fail the storage area of the storage device based on the detected failures.

19 Claims, 6 Drawing Sheets

(51) Int. Cl.
 *G06F 11/07* (2006.01)
 *G06F 11/30* (2006.01)
(52) U.S. Cl.
 CPC .... *G06F 11/3037* (2013.01); *G06F 2201/805* (2013.01); *G06F 2201/81* (2013.01); *G06F 2201/82* (2013.01)
(58) Field of Classification Search
 CPC ............ G06F 11/1608; G06F 11/1666; G06F 11/3003; G06F 11/3034; G06F 2201/805; G06F 2201/81; G06F 2201/82; G06F 12/00; G06F 12/0246; G06F 12/06
 See application file for complete search history.

(56) References Cited

U.S. PATENT DOCUMENTS

| | | | |
|---|---|---|---|
| 10,019,332 B1* | 7/2018 | Sehgal | G11C 16/10 |
| 10,204,003 B2* | 2/2019 | Ninose | G06F 11/0727 |
| 2014/0006847 A1* | 1/2014 | Guo | G06F 11/1068 |
| | | | 714/6.1 |
| 2016/0188424 A1* | 6/2016 | Walls | G06F 11/2056 |
| | | | 714/6.3 |
| 2016/0259675 A1* | 9/2016 | Ninose | G11C 29/76 |
| 2018/0011642 A1* | 1/2018 | Koseki | G06F 3/0649 |

\* cited by examiner

FAILURE DETECTION AND DATA RECOVERY IN A STORAGE SYSTEM

SUMMARY

Systems and methods presented herein provide for failure detection and data recovery in a storage system. In one embodiment, a method operable with a storage device includes locating failures in data blocks in a storage area of the storage device, and categorizing the failures into block groups. Each block group comprises one or more data blocks having failures. The method also includes halting input/output (I/O) operations to data blocks in a first of the block groups due to the failures of the first block group, detecting additional failures in one or more data blocks of block groups remaining in the storage area, and determining when to fail the storage area of the storage device based on the detected failures.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles that are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
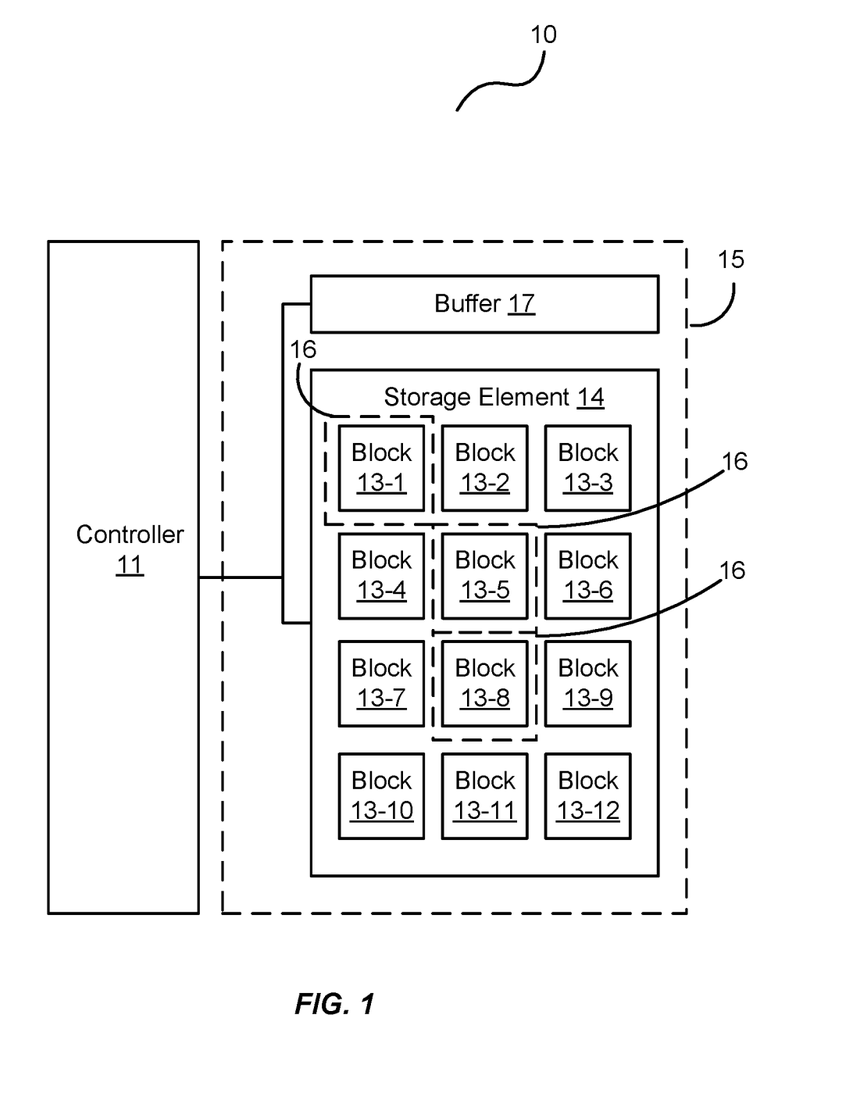
FIG. 1 is a block diagram of an exemplary storage system.

FIG. 1 is a block diagram of an exemplary storage system 10 that is operable to store data resulting from I/O requests from a host system (exemplarily shown below). The storage system 10 comprises a storage device 15, which further comprises a storage element 14 (e.g., a non-volatile NAND flash device or other persistent storage device) for persistently storing data, shown in greater detail below. The storage element comprises a plurality of storage areas for storing the data. The storage device may also include an optional buffer 17 (e.g., Dynamic Random Access Memory, or "DRAM", for caching, staging, etc.).

The storage system 10 also includes a controller 11 operable to process the I/O requests to write data to and to read data from the storage device 15. The controller 11 is also operable to maintain the integrity of the data stored with the storage device 15. For example, the controller 11 may remove data redundancies through a process called data deduplication, perform "garbage collection," and test degradation of the storage device 15, etc. In one embodiment, the controller 11 is operable to detect failures of individual data blocks 13 of storage areas in the storage device 15 and to "fail" those data blocks 13 such that I/O operations to those data blocks 13 are terminated after the controller 11 experiences error when programming those data blocks 13 a certain number of times.

For example, some data storage devices, such as Solid State Drives (SSDs), do not employ moving mechanical components like a Hard Disk Drive (HDD) does. These devices use integrated circuitry as memory cells to persistently store data. The memory cells are arranged in "pages", which are arranged in "blocks". And, the data blocks 13 are arranged on a "plane" of a die. When data is to be written to storage device 15, the controller 11 programs the device 15 on a page-by-page basis until a data block 13 is full. Once the data block 13 of the storage device 15 is full, the data block 13 is closed until the controller 11 performs an erasure process on the block.

However, the memory cells are prone to failures the more they are used. Generally, the memory cells are designed to handle many thousands of erases, reads, and writes before a failure occurs. In some NAND flash devices, the erases and writes (a.k.a. "programs") to the memory cells wear out the oxide layer of the floating gates of the cells, destroying their ability to store data. Once the memory cells of a data block 13 fail, they can no longer reliably store data. Eventually, an entire data block 13 itself fails. And, a systemic failure can occur when multiple data blocks 13 fail consecutively in a given plane on a die due to a "periphery defect".

Previous systems would detect a failure of an operation and mark the failing location as defective and move on to the next location. The most detrimental form of such an event is losing a whole die which causes simultaneous data loss and failure of the SSD. The embodiments herein overcome such problems by detecting failure events, categorizing a breadth of failures, preemptively marking predicted locations as failing, and recovering data from the predicted failed locations without losing user data and/or impacting performance, thereby preventing total SSD failure.

In one embodiment, the data blocks 13 are categorized into block groups, such as block group 16, with each block group comprising data blocks 13 that are experiencing errors. For example, the data blocks 13-1, 13-5, and 13-8 are experiencing similar numbers and/or types of errors and are therefore categorized into the block group 16. The remaining data blocks 13 in the storage element 14 may not yet be experiencing errors and are therefore not categorized in a particular block group. Alternatively, the remaining data blocks 13 that are not experiencing errors may be placed in a block group 16 that indicates they are not experiencing errors. The individual data blocks 13 of the block group 16, however, may still be relied upon to store data. That is, the errors that the data blocks 13 of the block group 16 may not yet be catastrophic and may instead be transient in nature.

The controller 11, thus, continues I/O operations to the block group 16 until it experiences a pre-determined number of errors. Then, when the errors of the block group 16 surpass that predetermined number, the controller 11 pre-emptively fails the data blocks 13 of that block group 16 to prevent subsequent I/O operations to the data blocks 13 in that block group 16. The controller 11 then reads the data from those data blocks 13 and moves or relocates it to another location in the storage element 14. This process may be performed as part of a background operation.

Although discussed with respect to SSDs, it should be noted that the embodiments herein are not intended to be limited to such devices. Rather, the embodiments herein may be used in any persistent storage device where data is arranged in blocks (or some other form of partitioning) of the storage device 15 which may degrade over time, including HDDs, shingled magnetic recording mediums, magnetoresistive storage devices, etc.

Based on the foregoing, the storage device 15 is any device operable to persistently store data (e.g., user data from a host system). And, the controller 11 is any device, system, software, firmware, or combination thereof operable to service I/O requests to the storage device 15 and maintain the data thereof by predicting when/where blocks 13 will fail and by pre-emptively moving the data thereof to other data blocks 13 of the storage element 14. The buffer 17 may be used to keep a record of the fail counts of the block groups 16 and/or other fail counts (e.g., of a die). The buffer 17 may be implemented as DRAM, single level cell NAND flash, or the like.

Figure 2:
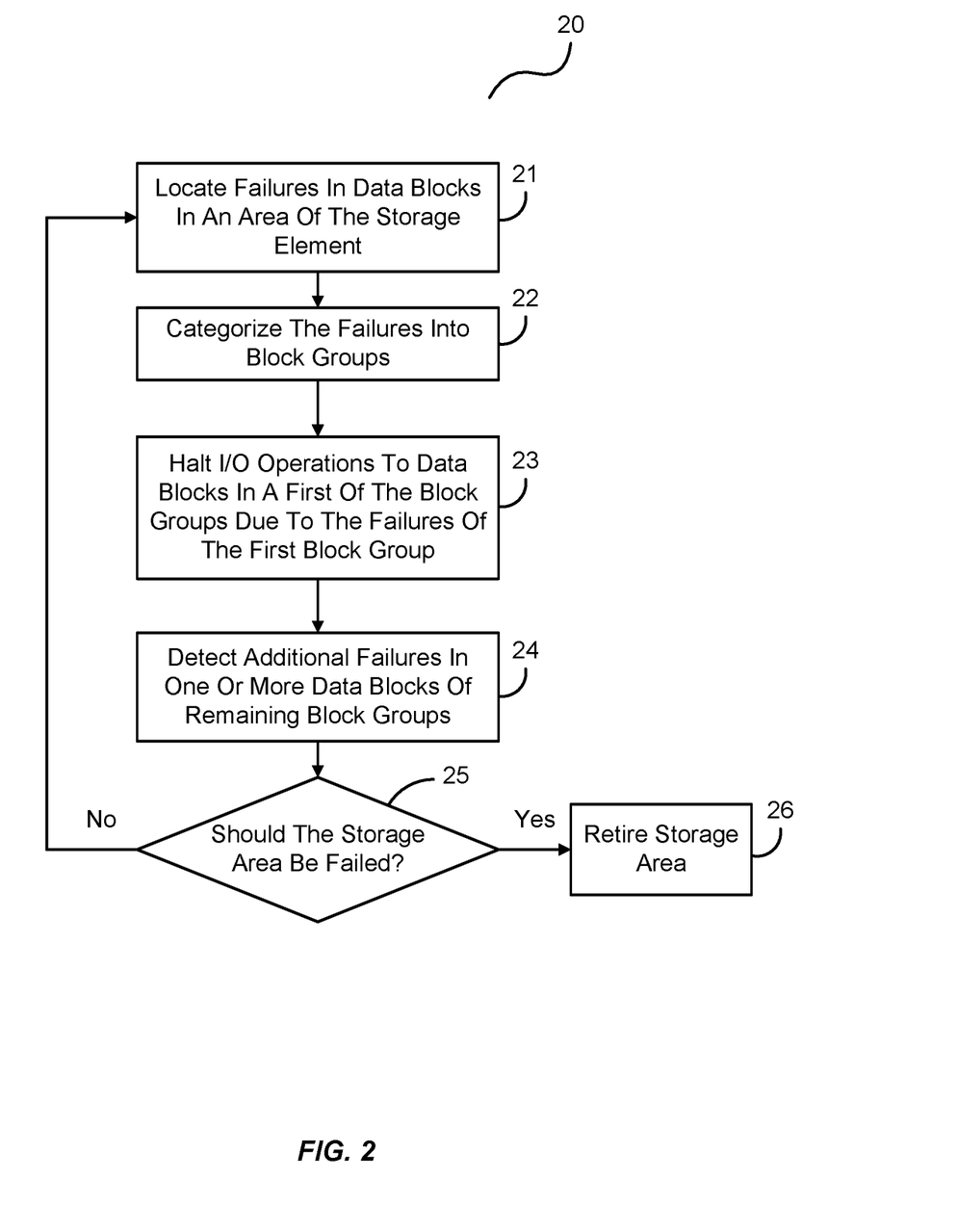
FIG. 2 is a flowchart of exemplary process of the storage system of FIG. 1.

FIG. 2 is a flowchart of an exemplary process 20 of the storage system 10 of FIG. 1. In this embodiment, the controller 11 locates failures in data blocks 13 in an area of the storage element 14, in the process element 21. For example, in an SSD embodiment, word lines are connected to gates of memory cells in a row of a page and are used to activate the entire row for reading, writing, and erasing. The controller 11 identifies which pages and word lines of a particular data block 13 are responsible for causing hard decision low density parity check (HLDPC) failures, erase failures, and/or program failures (e.g., write failures) when the controller 11 attempts to program a data block 13 of the storage device 15.

Then, the controller 11 categorizes the data blocks 13 and their failures into block groups 16, in the process element 22. For example, if the data blocks 13-1, 13-5, and 13-8 are experiencing program failures, the controller 11 may group those data blocks 13 into a block group 16 that indicates that the failures are program failures. The controller 11 may start counting the number of program failures that occur for those data blocks 13. If the controller 11 determines that the block group 16 has breached a certain number of failures, the controller 11 halts I/O operations to the data blocks 13 of that block group, in the process element 23, preemptively failing the data blocks 13 of that particular block group 16. The controller 11 may then move the data thereof to other data blocks 13.

The controller 11 continues to monitor the remaining block groups 16 to detect any additional failures in data blocks 13 (e.g., those experiencing different numbers and/or types of errors), in the process element 24. If additional data blocks 13 of other block groups 16 are experiencing failures, the controller then determines whether to fail the entire storage area, in the process element 25. For example, in an SSD embodiment, the controller 11 may determine too many data blocks 13 of a particular die are failing. So as to prevent the die from failing and causing potentially catastrophic failure of the entire storage system 10, the controller 11 retires/fails the entire storage area, in the process element 26, and moves the data of those data blocks 13 into another location. Otherwise, the controller 11 continues to locate failures in data blocks 13, in the process element 21.

Figure 3:
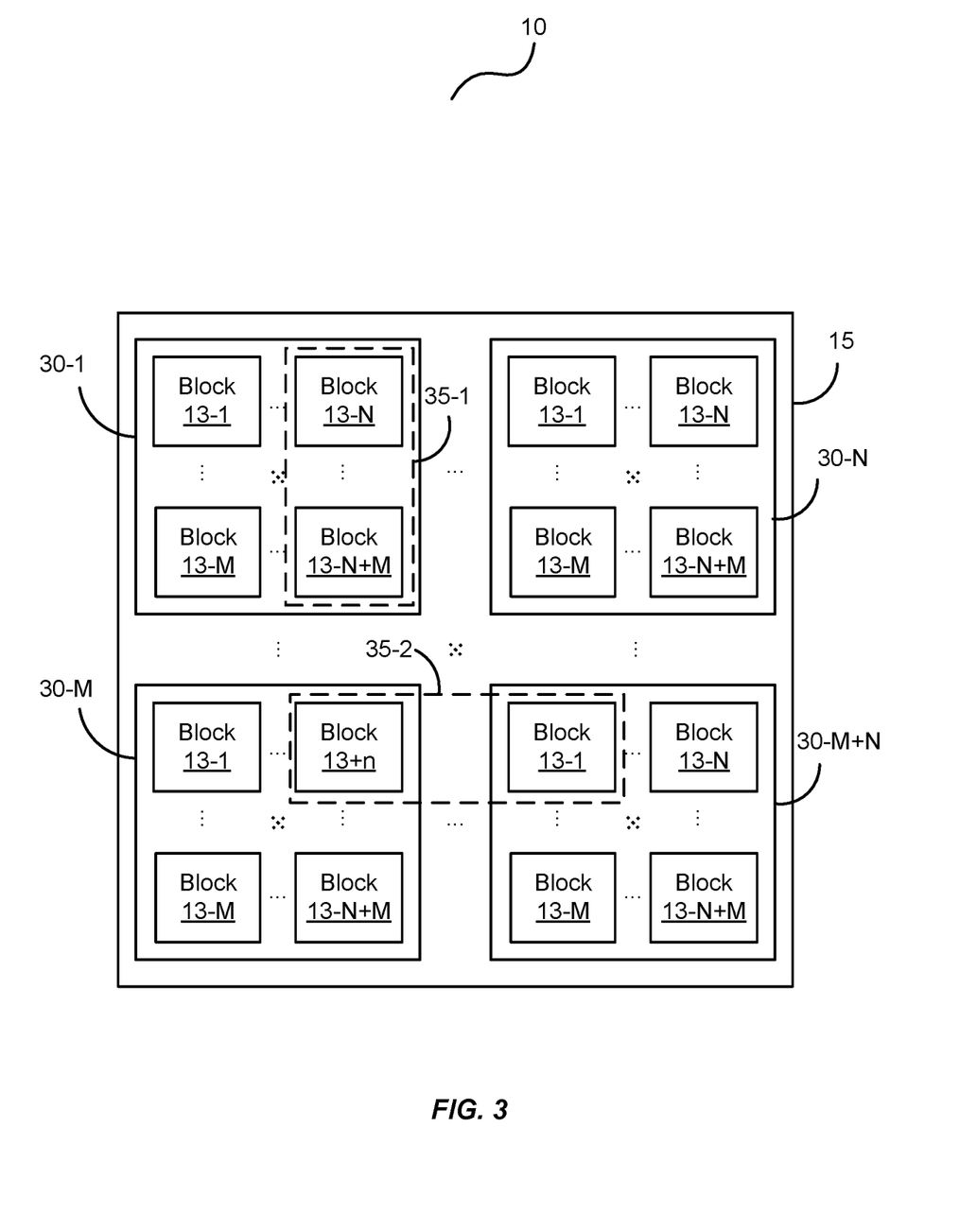
FIG. 3 is a block diagram of a storage element in an exemplary SSD embodiment comprising a plurality of dies and data blocks.

FIG. 3 is a block diagram of a storage element 14 in an exemplary SSD embodiment comprising a plurality of dies 30-1-30-M+N, each of which comprises a plurality of data blocks 13-1-13-M+N (where "M" and "N" are integers and not necessarily equal to each other or other "M" or "N" references herein). In this embodiment, the block diagram shows that the controller 11 has grouped the data blocks 13-N, 13N+1, 13N+2, 13-N+M into a first block group 35-1 for experiencing a certain number or type of errors. These data blocks 13 are located within the die 30-1. Once the controller 11 determines that the errors of the block group 35-1 are no longer sustainable, the controller 11 may fail the data blocks 13 of the block group 35-1 so as to preserve the die 30-1. If the controller 11 determines that the number of data blocks 13 is experiencing too many errors, the controller 11 may fail the entire die 30-1 so as to preserve the storage element 15.

The controller 11 may also be able to categorize data blocks 13 across multiple dies 30, as illustrated with the block group 35-2. For example, if the controller 11 determines that the dies 30-M and 30-N+M are experiencing a certain number and type of errors (e.g., program failures), the controller 11 may determine that the errors are not sustainable and fail both dies 30-M and 30-N+M. Once the controller 11 fails a die, I/O operations are halted to the die.

Figure 4:
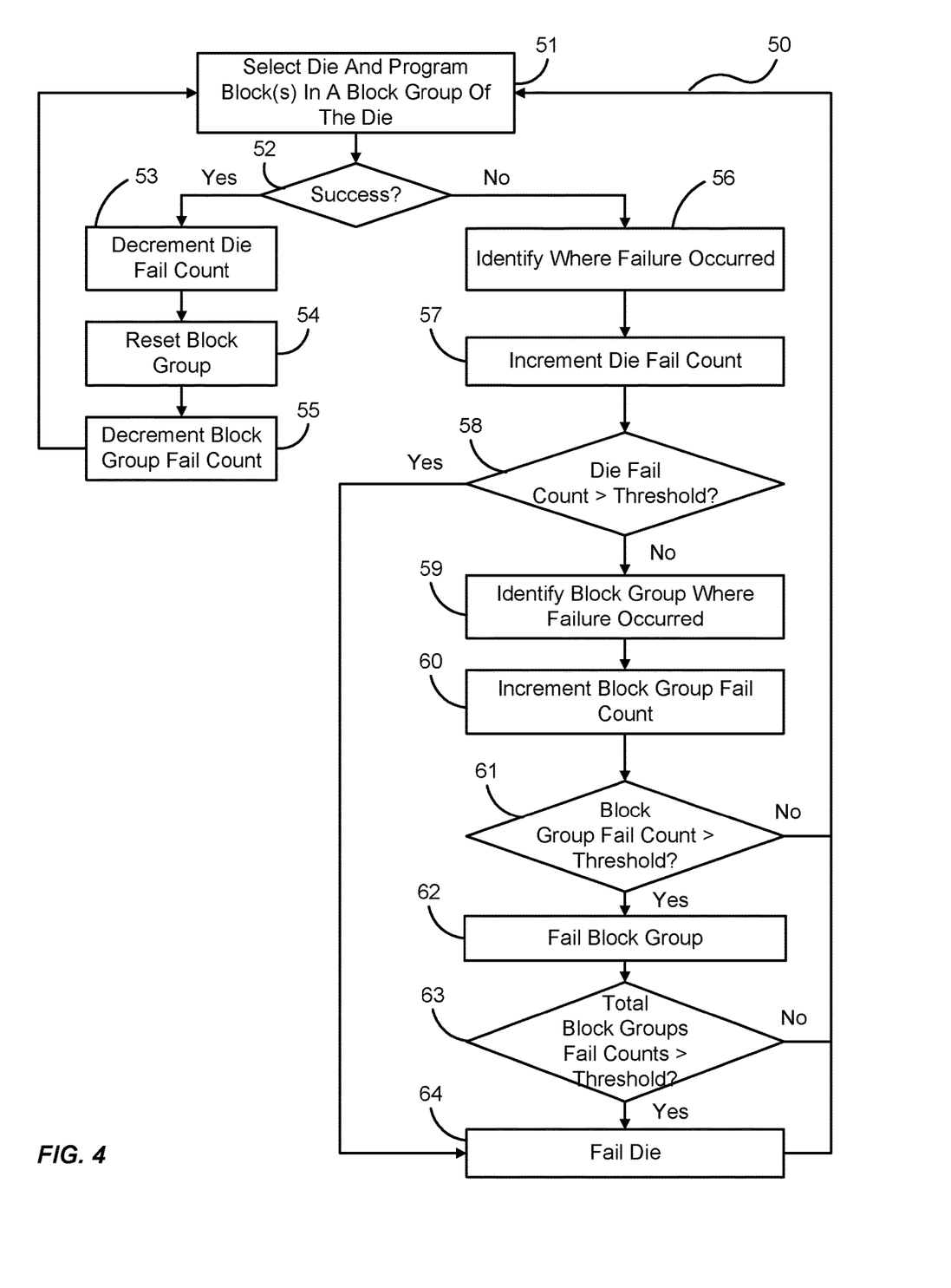
FIG. 4 is a block diagram of an exemplary storage controller and its associated storage device.

FIG. 4 is another flow chart of an exemplary process 50 of the storage system 10 in an SSD embodiment. In this embodiment, the controller selects a die 30 to program a data block 13 in a block group 16 of the die 30, in the process element 51. If the program is a success, the controller 11 decrements the fail count of the die 30, in the process element 53. The controller 11 then resets and/or decrements the fail count of the block group 16 within that die 30, in the process element 54. For example, if the controller 11 determines that the block group 16 of data blocks 13 of the die 30 is no longer a detriment to the die 30, the controller 11 may decrement fail count of that block group 16 and resume I/O operations to the data blocks 13 of that block group 16. The controller 11 may perform this operation for every block group 16 within that particular die 30. Afterwards, the controller 11 returns to the process element 51 to select and program another die 30 of the storage element 14.

If the programming of the die 30 was a failure, the controller 11 identifies where the failure occurred in the die 30, in the process element 56. For example, block groups 16 of the die 30 may be categorized based on locations, such as common word lines of data blocks 13 in the die 30. The controller 11 may keep a record of the errors occurring at these locations. Then, if the programming failure occurs consecutively and/or repeatedly at these locations, the controller 11 increments the fail count of the die 30, in the process element 57. If the fail count of the die 30 breaches a threshold level, in the process element 58, the controller preemptively fails the entire die 30, in the process element 64, and halts all I/O operations to the die 30 and moves the data thereof to another die 30.

If, however, the fail count of the die 30 has not breached its threshold, the controller 11 determines where the failure of the die 30 occurred. For example, the controller 11 may identify a particular block group 16 where the failure occurred in the die 30. The controller 11, keeping a record of the fail counts of the individual block groups 16 of the die 30, increments the fail count of that particular block group 16, in the process element 60. The controller 11 may perform this operation for each block group 16 of the die 30.

The controller 11 then determines whether that particular block group 16 of the die 30 has breached a threshold number of errors, in the process element 61. If it has not, the controller 11 may select another block group 16 of another die 30, or the same die 30, in the process element 51. If, however, the block group 16 of data blocks 13 has experienced a number of errors that breaches the threshold, the controller 11 fails the data blocks 13 of that particular block group 16, in the process element 62, and moves the data thereof into a another block group 16 of data blocks 13 (in the same or another die 30).

Thereafter, the controller 11 determines whether the total number of failures of all the block groups 16 in the die 30 have breached a threshold number, in the process element 63. If not, the controller 11 may select another block group 16 of another die 30, or the same die 30, in the process element 51. This means that the die 30 is still sustainable and I/O operations can continue to the die 30 in the data blocks 13 where errors are occurring less frequently or not at all. Otherwise, the controller 11 determines that the die 30 is no longer sustainable and preemptively fails the die 30, in the process element 64. This means that the die 30 no longer receives I/O operations so as to preserve the remaining dies 30 of the storage element 14. Once the I/O operations have been halted to the die 30, the controller 11 moves the data thereof to another die 30 within the storage element 14. The controller 11 may then select another die 30 for programming, in the process element 51.

It should be noted that the threshold number of errors for the dies 30 and/or the block groups 16 may be selected as a matter of design choice. Generally, the number is set to be relatively low (e.g., ~3 consecutive errors or ~3 repeated types of errors) so as to preserve the health of the storage element 14.

Figure 5:
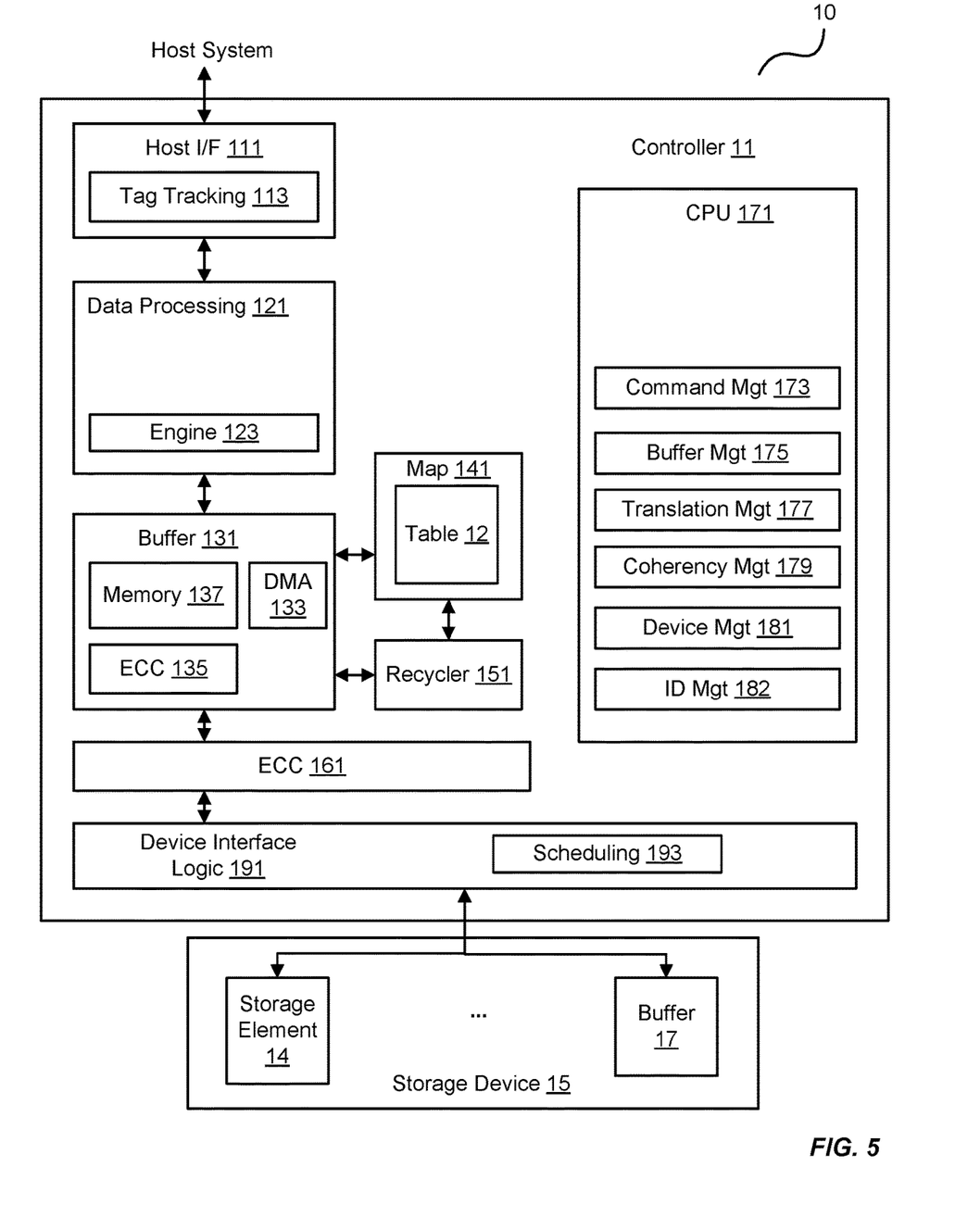
FIG. 5 is a block diagram of an I/O module comprising storage devices and their associated controllers interfacing with a host system.
Figure 6:
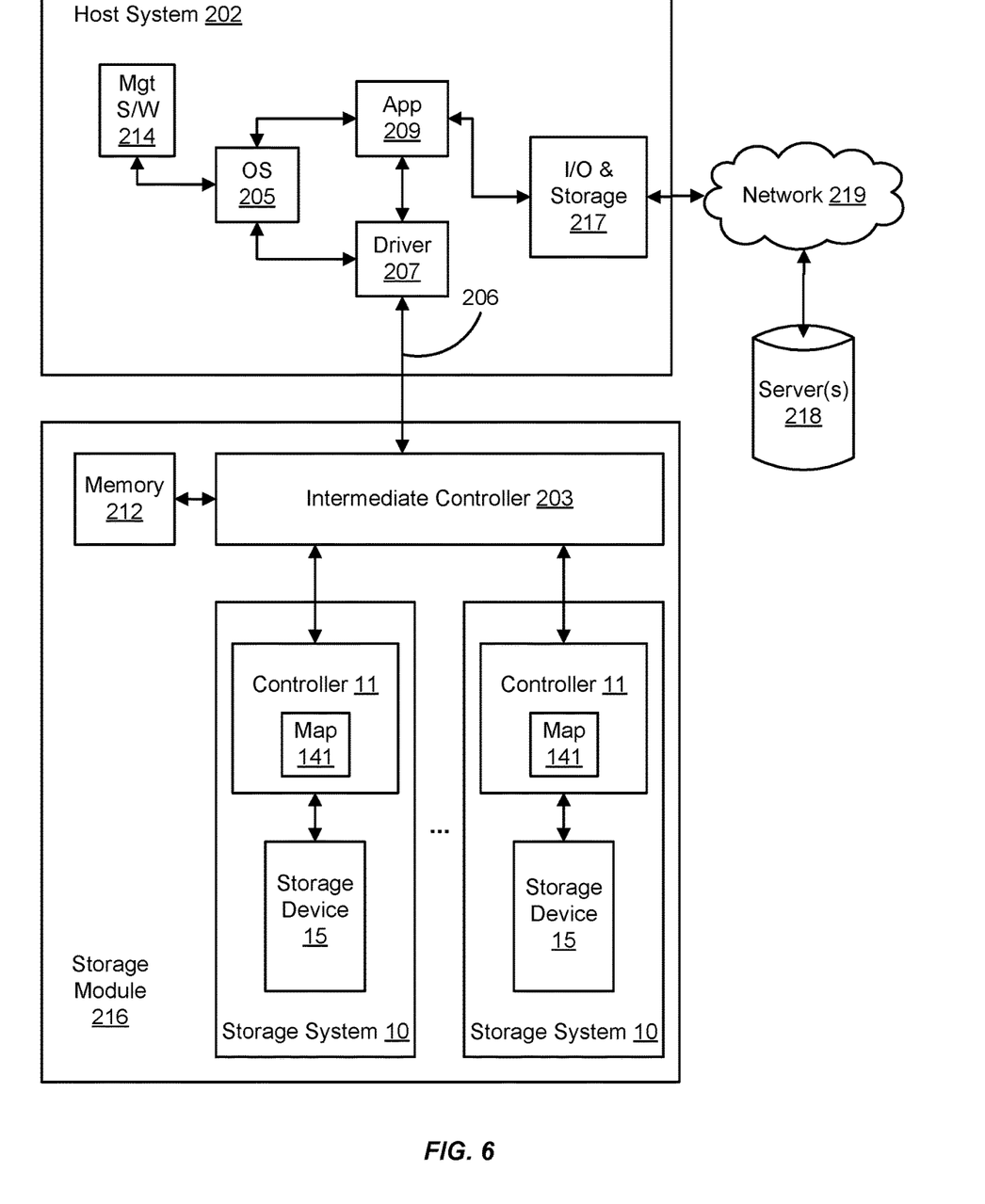
FIG. 6 is a block diagram of an I/O module comprising SSDs and their associated controllers/storage devices interfacing with a host system.

The embodiments herein can take the form of hardware, firmware, software, or a combination thereof. FIGS. 5 and 6 illustrate such a combination that may be operable to employ the systems and methods described herein. More specifically, FIG. 5 is a block diagram of an exemplary storage system 10 and its associated device controller (e.g., the controller 11) and storage device 15 (e.g., the storage element 14 and the buffer 17 of FIG. 1). FIG. 6 is a block diagram of a storage module 216 comprising storage systems 10 and their associated controllers 11/storage devices 15 interfacing with a host system 202.

In FIG. 5, the controller 11 includes a host interface 111 that is operable to interface with a host system to communicate I/O operations of the host system. The host interface 111 may be configured with a tag tracking module 113 that is operable to track progress of individual I/O commands (e.g., read and write commands to certain addresses in the storage device 15). The tag tracking module 113 may associate an external flag of a command received from the host system with an internal flag that the controller 11 can access during processing of the command to identify the status of the processing.

The controller 11 also includes a data processing module 121 that comprises a processing engine 123 generally operable to perform certain tasks on data that is received from the host interface 111 or residing within a buffer 131, such as formatting the data, transcoding the data, compressing the data, decompressing the data, encrypting the data, decrypting the data, data encoding/formatting, or any combination thereof. For example, a processing engine 123 of the data processing module 121 may be operable to process an I/O operation from an I/O module of the host system, such that the data of the I/O operation may be written to the logical address of the storage device 15. The processing engine 123 may extract the data of the write I/O command and prepare it for storage in the storage device 15. In doing so, the processing engine 123 may compress the data using any of a variety of data compression algorithms. When retrieving the data from the storage device 15, the processing engine 123 may decompress the data according to the algorithm used to compress the data for storage.

The buffer 131 is operable to store data transferred to and from the host system. The buffer 131 may also store system data, such as memory tables used by the controller 11 to manage the storage element 14, the buffer 17, and any possible higher-level RAID functionality in the memory 137. Other modules may include an ECC module 135 to provide higher-level error correction and redundancy functionality, and a Direct Memory Access (DMA) module 133 to control movement of data to and from the buffer 131.

The controller 11 also includes an error correction code module 161 operable to provide lower level error correction and redundancy processing of the data in the buffer 131 using any of a variety of error correction codes techniques (e.g., cyclic redundancy checks, Hamming codes, BCH codes, LDPC codes, etc.).

A device interface logic module 191 is operable to transfer data to and from the storage device 15 according to the protocol of the devices therein. The device interface logic module 191 includes a scheduling module 193 that is operable to queue I/O operations to the storage device 15.

The controller 11 herein also includes a map module 141 that is operable to perform data addressing to locations in the storage device 15 according to the lookup table 12. For example, the map module 141 may use the lookup table 12 to convert logical block addresses (LBAs) from the host system to block/page addresses directed to the buffer 17, the storage element 14, or both. The lookup table 12 may be stored in whole or in part in controller 11 and/or in storage device 15. For example, in some embodiments a portion of the lookup table 12 may be cached in the controller 11 with generally all of lookup table 12 being stored non-volatilely in the storage device 15.

A recycler 151 performs garbage collection on behalf of the controller 11. For example, the recycler 151 may determine portions of the storage device 15 that are actively in use by scanning the lookup table 12 of the map module 141. In this regard, the recycler 151 may make unused, or "deallocated", portions of the storage device 15 available for writing by erasing the unused portions. The recycler 151 may also move data within the storage device 15 to make larger contiguous portions of the storage device 15 available for writing.

The controller 11 also includes one or more central processing units (CPUs) 171 that controls various aspects of the controller 11. For example, the CPU 171 may process instructions or firmware to implement command management 173 that tracks and controls commands received from the host system. This firmware may also implement buffer management 175 that controls allocation and use of the buffer 131 and translation management 177 or to control the map module 141. The firmware may also employ coherency management 179 to control consistency of data addressing to avoid conflicts such as those that may occur between external data accesses and recycled data accesses. The firmware may also provide device management 181 to control the device interface logic module 191 and identity management 182 to control modification and communication of identity information of components within the controller 11.

In FIG. 6, the host system 202 is operable to process software instructions and perform I/O operations with the storage module 216 to read from and write to one or more storage systems 10. In this regard, the host system 202 may include an operating system 205 that provides the computing environment for the host system 202. A driver 207 is operable to communicate through the link 206 to the storage module 216 to perform the I/O operations with the various storage systems 10 configured therewith.

Like other computing systems, the operating system 205 may be initiated via management software 214 (e.g., Bios software). The host system 202 may also include application software 209 to perform various computing processes on behalf of the host system 202 (e.g., word processing applications, image processing applications, etc.). The host system 202 may also include I/O and storage functionality 217 operable to conduct I/O operations with one or more servers 218 through a communication network 219 (e.g., the Internet, local area networks, wide-area networks, etc.). In this regard, the storage module 216 may act as a cache memory of I/O operations for the host system 202.

The storage module 216 may be configured with an intermediate controller 203 that is operable to switch various I/O operations of the host system 202 to LBAs of the storage systems 10. In this regard, the storage module 216 may include a memory 212 that stores mapping information for the intermediate controller 203 to conduct the I/O operations to the LBAs. The memory 212, being a computer readable medium as well as other components herein, may also store software and/or firmware comprising instructions for execution by the controller 11 to carry out the above embodiments. The map module 141 of the controller 11 may also be operable to perform data addressing with variable-sized mapping units to locations in the storage device 15 according to the lookup table 12, and to convert LBAs from the host system 202 to block/page addresses directed to the storage device 15.

What is claimed is:

1. A storage system, comprising:
    a storage device configured in a plurality of storage areas, each storage area comprising a plurality of data blocks; and
    a controller operable to organize a portion of the plurality of data blocks of a first of the storage areas into block groups, each block group comprising two or more data blocks experiencing failures, and to maintain failure counts for each of the block groups,
    the controller being further operable to halt input/output (I/O) operations to the two or more data blocks in a first of the block groups upon determining that the failure count maintained for the first of the block groups has breached a first threshold.

2. The storage system of claim 1, wherein:
    the storage system is a Solid State Drive (SSD) and the first of the storage areas of the storage device is a die of the SSD.

3. The storage system of claim 2, wherein:
    the controller is further operable to fail the die when the total of the failure counts for all of the block groups containing data blocks in the die breach a second threshold level.

4. The storage system of claim 3, wherein:
    the controller is further operable to relocate data of the die to another die after failing.

5. The storage system of claim 2, wherein data blocks of the die are organized into block groups based on a location on the die related to the failures.

6. The storage system of claim 2, wherein data blocks of the die are organized into block groups based on having a common word line on the die with a data block experiencing the failures.

7. The storage system of claim 1, wherein data blocks experiencing failures are organized into block groups based on a type of failure experienced by the data blocks.

8. A method operable in a storage system, the method comprising:
    organizing data blocks in a storage area of a storage device into block groups, each block group comprising two or more data blocks experiencing failures;
    maintaining failure counts for each of the block groups; and
    halting input/output (I/O) operations to the two or more data blocks in a first of the block groups upon determining that the failure count for the first of the block groups has breached a first threshold.

9. The method of claim 8, wherein:
    the storage system is a Solid State Drive (SSD) and the storage area of the storage device is a die of the SSD.

10. The method of claim 9, further comprising:
    failing the die when the total of the failure counts for all of the block groups containing data blocks in the die breach a second threshold level.

11. The method of claim 10, further comprising:
    relocating data of the die to another die after failing.

12. The method of claim 9, wherein data blocks of the die are organized into block groups based on a location on the die related to the failures.

13. The method of claim 9, wherein data blocks of the die are organized into block groups based on having a common word line on the die with a data block experiencing the failures.

14. The method of claim 8, wherein data blocks experiencing failures are organized into block groups based on a type of failure experienced by the data blocks.

15. A non-transitory computer readable medium operable in a storage system and comprising instructions that, when executed by a controller of the storage system, direct the controller to:
    organize two or more data blocks of a plurality of data blocks in a storage area of a storage device into a first block group, the two or more data blocks experiencing similar failures;
    maintain a failure count for the first block group; and
    halt input/output (I/O) operations to the data blocks in the first block group upon determining that the failure count for the first block group has breached a first threshold.

16. The computer readable medium of claim 15, wherein:
    the storage system is a Solid State Drive (SSD) and the storage area of the storage device is a die of the SSD.

17. The computer readable medium of claim 16, further comprising instructions that direct the controller to:
    fail the die when the total of the failure counts for all block groups containing data blocks in the die breach a second threshold level.

18. The computer readable medium of claim 17, further comprising instructions that direct the controller to:
    relocate data of the die to another die after failing.

19. The computer readable medium of claim 15, wherein the two or more data blocks experiencing similar failures are organized into the first block group based on program failures experienced by the data blocks.

\* \* \* \* \*